M. L. WATSON.
PLOW.
APPLICATION FILED MAR. 15, 1911.
1,002,344.
Patented Sept. 5, 1911.
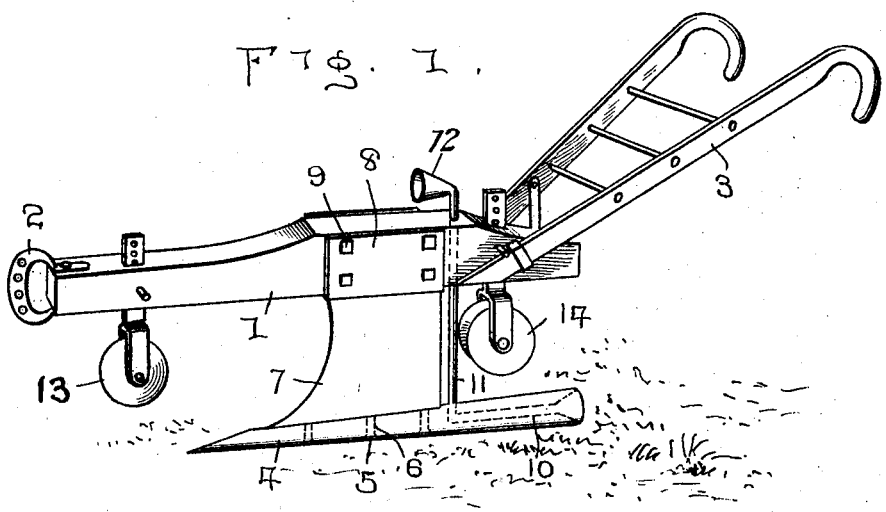
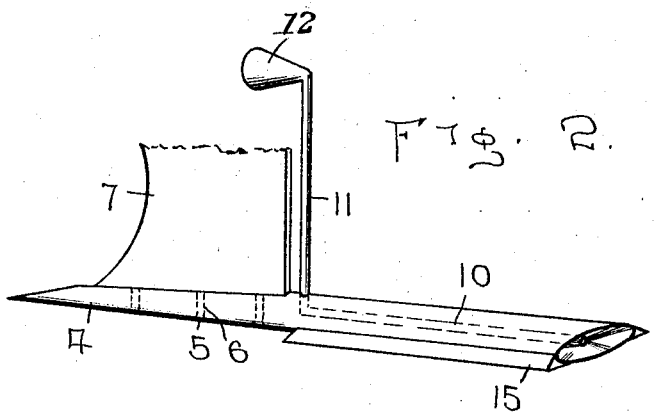
WITNESSES:
INVENTOR
M. L. Watson
BY
W. J. Fitzgerald Co.,
Attorneys

UNITED STATES PATENT OFFICE.

MORRIS L. WATSON, OF SATUMA, ARKANSAS, ASSIGNOR OF ONE-HALF TO JAMES J. BOYETTE, OF SATUMA, ARKANSAS.

PLOW.

1,002,344. Specification of Letters Patent. Patented Sept. 5, 1911.

Application filed March 15, 1911. Serial No. 614,693.

*To all whom it may concern:*

Be it known that I, MORRIS L. WATSON, a citizen of the United States, residing at Satuma, in the county of Perry and State of Arkansas, have invented certain new and useful Improvements in Plows; and I do hereby declare the following to be a full, clear, and exact description of the invention, such as will enable others skilled in the art to which it appertains to make and use the same.

My invention relates to new and useful improvements in plows and more particularly to a device adapted to loosen the earth to form air passages therein.

The object of my invention is to provide a device which, when operated, will form a passage-way in the ground in which air will be drawn so that the ground will be loosened and aerated and moisture retained.

A further object is to provide means whereby the depth to which the device will operate may be regulated.

Other objects and advantages of my invention will be hereinafter made clearly apparent and pointed out in the claims appended hereto.

In the accompanying drawing, I have shown the preferred forms of my invention. In said drawing, Figure 1 is a perspective view of my improved form of plow, and, Fig. 2 is a perspective view of a portion of a modified form which my invention may take.

Referring to the drawing in which similar reference numerals designate corresponding parts throughout the several views, 1 is the beam of my improved form of plow which is preferably constructed of wood and may be, if desired, formed of sheet metal or any other desired suitable material.

The forward end of the beam is provided with a clevis 2 of the usual or any preferred form and at its rear end with a pair of upwardly and rearwardly extending handles 3 of the usual construction, by means of which the plow may be guided.

The air passage forming device of my plow consists of an elongated tapering member 4 which may be of any desired shape in cross section, but which is preferably substantially circular in cross section. The forward end of the member 4 is tapered forwardly and downwardly so that said member tends to move deeper into the ground. The member 4 is caused to move at a predetermined distance from the surface as hereinafter clearly set forth.

The forward end of the member 4 is provided with a plurality of apertures 5, through which studs or bolts 6 are adapted to pass. The studs or bolts 6 are formed integrally with or secured to a cutting blade 7 which is vertically disposed and provided at its upper end with a U-shaped member 8, the parts of said U-shaped member adapted to extend on either side of the beam 1 and be secured thereto by means of suitable bolts 9.

The lower ends of the studs or bolts 6 may be screw-threaded to receive nuts, or said ends may be swaged, to hold the member 4 rigidly connected to the cutting blade 7. The member 7 is formed of metal which is of narrow width and has its forward edge sharpened so as to easily pass through the ground.

The rear portion of the member 4 is provided with a longitudinally extending opening 10 therethrough, said opening flaring outwardly at the rear end of said member, as shown in dotted lines in Fig. 1. The forward end of said opening 10 extends upwardly and a pipe 11 is secured therein, said pipe extending upwardly adjacent the rear edge of the cutting blade 7 and through the beam 1.

The upper end of the pipe 11 is provided with a forwardly and outwardly flaring member 12, for a purpose hereinafter more clearly set forth.

The forward end of the beam 1 is provided with a suitable colter or cutting disk 13, which is vertically adjustable relative to said beam. The rear end of the beam adjacent the pipe 11 is provided with a vertically adjustable roller 14, the periphery of said roller being concaved, so that after the cutting blade has passed through the earth, the concaved surface of the roller 14 will tend to close the opening formed by said blade.

The cutting disk 13 and the roller 14 are set in desired positions and will thereafter limit the depth to which the plow will work. Owing to the tendency of the member 4 to work deeper and deeper into the ground, the roller 14 will be held tightly against the surface of the ground and caused to perform its function of closing the furrow made by the cutting blade 7.

When in use, the plow is drawn forwardly and the member 4 will be drawn through the ground, leaving an opening therein. As clearly shown in Fig. 1, the roller 14 is mounted forwardly of the rear end of said member 4 and tends to pack the earth around the rear end of said member, whereby the passage of said member tends to form a partial vacuum in the rear thereof. As the member 4 passes through the ground, air will be drawn through the pipe 11 and member 12. As the plow moves forwardly in use, the flaring member 12 tends to collect the air in front thereof, which travels down the pipe 11 and into the channel formed by the member 4.

In Fig. 2, I have shown a member 4 which instead of being circular in cross section, is elliptical in cross section and provided upon opposite sides with flange members 15. The flange members 15 are substantially triangular in cross section and are secured to the member 4 so that the lower surface of said member and flanges is substantially flat. By this construction, a strip of earth of considerable width can be loosened and aerated.

From the foregoing, it will be seen that I have provided a plow construction which is adapted to loosen the earth and to completely aerate the same.

It will further be seen that the depth to which the plow will operate may be regulated.

It will further be seen that by providing channels in the earth and by loosening the surface of the ground above said channels, the collection of surface water will be prevented.

What I claim as new is:

1. The herein described plow, comprising a beam, a vertically extending cutting blade secured thereto, a forwardly extending tapering member secured to the lower end of said cutting blade, and air conducting means secured to said tapering member.

2. The herein described plow, comprising a beam, a vertically extending cutting blade secured thereto, a forwardly tapering member secured to the lower end of said cutting blade, an adjustable roller pivotally secured adjacent the rear edge of said cutting blade, and means to conduct air to the rear end of said tapering member.

3. The herein described plow, comprising a beam, a cutting blade attached thereto and a forwardly tapering member secured to the lower end of said cutting blade, the rear end of said tapering member having an opening therein, an upwardly extending pipe secured to said tapering member and communicating with said opening, the upper end of said pipe being forwardly and outwardly flared.

4. The herein described plow, comprising a beam, a vertically extending cutting blade secured thereto, a forwardly tapering member secured to the lower end of said blade, an adjustable cutting disk secured to the forward end of said beam, a roller adapted to travel in rear of said cutting blade and means to conduct air to the rear end of said tapering member.

5. The herein described plow, comprising a beam, a vertically extending cutting blade secured thereto, a forwardly tapering member secured to the lower end of said blade, a roller adapted to travel in rear of said cutting blade for the purpose described, and means to conduct air to the rear end of said tapering member.

In testimony whereof I have signed my name to this specification in the presence of two subscribing witnesses.

MORRIS L. WATSON.

Witnesses:
J. W. QUINN,
J. J. BOYETT.